(12) United States Patent
Di Grande

(10) Patent No.: US 7,530,600 B2
(45) Date of Patent: May 12, 2009

(54) TEMPORARY HOLD MECHANISM FOR A BUCKLE ASSEMBLY

(75) Inventor: Jason Di Grande, Macomb, MI (US)

(73) Assignee: Nissan Technical Center North America, Inc., Farmington Hills, MI (US)

(*) Notice: Subject to any disclaimer, the term of this patent is extended or adjusted under 35 U.S.C. 154(b) by 369 days.

(21) Appl. No.: 11/655,476

(22) Filed: Jan. 19, 2007

(65) Prior Publication Data

US 2007/0164596 A1 Jul. 19, 2007

Related U.S. Application Data

(60) Provisional application No. 60/760,259, filed on Jan. 19, 2006.

(51) Int. Cl.
*B60R 21/26* (2006.01)

(52) U.S. Cl. .................... 280/801.1; 297/468; 297/481; 24/684

(58) Field of Classification Search .............. 280/801.1, 280/801.2; 297/468, 481, 482; 24/682.1, 24/684, 686
See application file for complete search history.

(56) References Cited

U.S. PATENT DOCUMENTS

| | | | | |
|---|---|---|---|---|
| 5,332,261 A | * | 7/1994 | Siepierski | 280/801.1 |
| 5,855,047 A | * | 1/1999 | Haas | 24/684 |
| 2006/0255647 A1 | * | 11/2006 | Hyatt et al. | 297/481 |

FOREIGN PATENT DOCUMENTS

DE 102 23 742 A1 * 12/2003
FR 2 809 694 A1 * 12/2001

* cited by examiner

*Primary Examiner*—Ruth Ilan
(74) *Attorney, Agent, or Firm*—Young Basile

(57) ABSTRACT

A temporary hold mechanism for a seat belt sub-assembly is disclosed. The seat belt buckle sub-assembly includes a mounting bracket, at least one seat belt buckle receptacle that is selectively movable between a pre-installed position and an installed position, a biasing element that biases the seat belt buckle sub-assembly into the installed position, and a selectively removable retaining element that selectively maintains the seat belt buckle sub-assembly in the pre-installed position. A method for temporarily holding the seat belt buckle sub-assembly is also disclosed.

20 Claims, 6 Drawing Sheets

TEMPORARY HOLD MECHANISM FOR A BUCKLE ASSEMBLY

TECHNICAL FIELD OF THE INVENTION

The present disclosure relates generally to a seat belt buckles, and more particularly to temporary hold mechanism for a seat belt buckle sub-assembly.

BACKGROUND OF THE INVENTION

Seat belt buckle assemblies have long been employed to assist in restraining vehicle occupants in the event of a collision or an accident. Indeed, in many states, use of seat belt buckle assemblies is required when motor vehicles are in operation.

Conventional seat belt buckle assemblies include at least a lap belt portion that has a buckle connected thereto positioned on one side of the vehicle seat and a seat belt buckle receptacle positioned on an opposite side of the vehicle seat. The lap belt portion (and shoulder portion if one is provided) is moved across the vehicle passenger and the buckle is engaged with the seat belt buckle receptacle.

In some vehicle models, the back seat of a motor vehicle includes three seats, a seat behind the vehicle driver, a seat behind a front seat passenger, and a center seat. To provide a seat belt buckle assembly for the center seat, it is known to provide a seat belt buckle sub-assembly that includes two buckle receptacles, one for the passenger sitting on one side of the vehicle and one for the passenger sitting in the center seat. While seat belt buckle receptacle sub-assemblies of this type are generally known, quick and easy installation of seat belt buckle receptacle sub-assemblies is challenging.

For example, seat belt buckle sub-assemblies typically include a mounting bracket on which the seat belt buckle receptacles are mounted. The mounting bracket, in turn, is secured to the vehicle frame. However, because a cushioned seat portion is installed over the vehicle frame, it is necessary to insure that the seat belt receptacles remain upright so that the seat portion does not conceal or restrict access the seat belt receptacles. Accordingly, it is desirable to bias the seat belt buckle receptacle into an upright position before installation.

However, when the seat belt buckle receptacles are biased into the upright position, it becomes difficult to access the mounting bracket with installation tools to secure the seat belt buckle sub-assembly to the vehicle frame. More specifically, the seat buckle receptacles block access to the mounting bracket. To access the mounting bracket, an installer must manually move the seat belt buckle receptacles into a pre-installed position with one hand, against the biasing force, and hold the seat belt buckle receptacles in this position while using an installation tool with the other hand secure the seat belt receptacle to the vehicle body. By having only one hand free to manipulate the installation tool, it may take longer to properly secure the seat belt buckle receptacle to the vehicle body, as well as lead to potential misalignment of the seat belt buckle receptacle. Therefore, what is needed is a temporary hold mechanism to retain the seat belt buckle receptacle sub-assembly in a pre-installed position that may be easily disengaged to return the seat belt buckle sub-assembly to an upright position once installation is complete.

SUMMARY OF THE INVENTION

A temporary hold mechanism for a seat belt sub-assembly is disclosed. The seat belt buckle sub-assembly includes a mounting bracket, at least one seat belt buckle receptacle that is selectively movable between a pre-installed position and an installed position, a biasing element that biases the seat belt buckle sub-assembly into the installed position, and a selectively removable retaining element that selectively maintains the seat belt buckle sub-assembly in the pre-installed position. When the retaining element is removed, the seat belt buckle sub-assembly automatically returns to its installed position. A method for temporarily holding the seat belt buckle sub-assembly is also disclosed.

BRIEF DESCRIPTION OF THE DRAWINGS

The present invention will now be described, by way of example, with reference to the accompanying drawings, in which.

DETAILED DESCRIPTION

Figure 1:
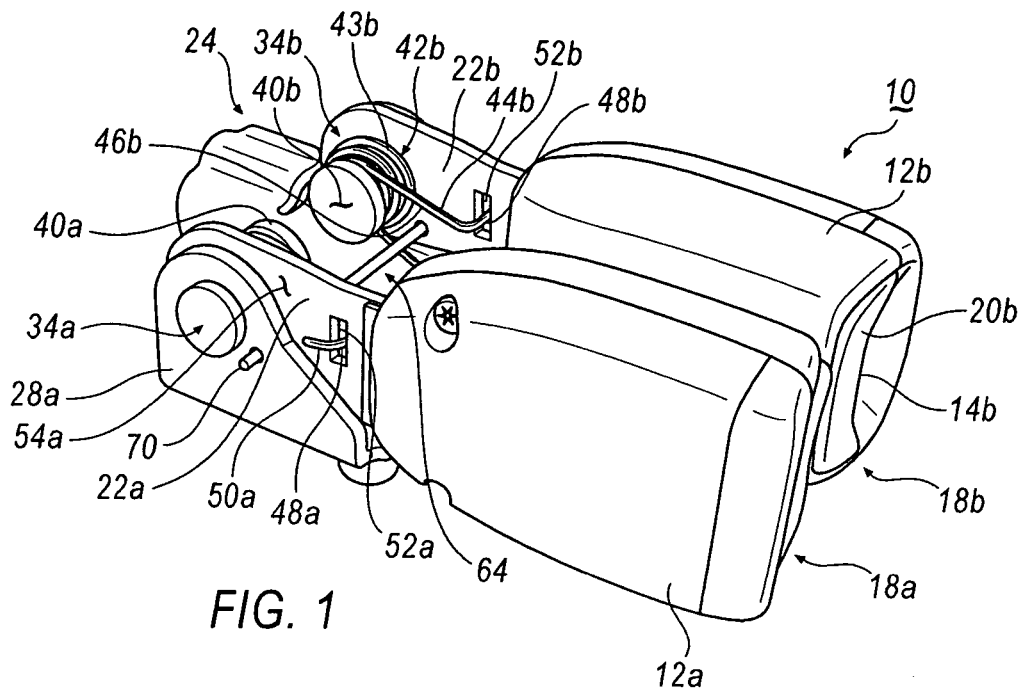
FIG. 1 is a perspective view of a seat belt buckle sub-assembly in a pre-installed position that includes a first embodiment of a temporary hold mechanism.

Referring now to the drawings, illustrative embodiments are shown in detail. Although the drawings represent various embodiments, the drawings are not necessarily to scale and certain mechanisms may be exaggerated to better illustrate and explain the innovative aspects of the embodiments. Further, the embodiments described herein are not intended to be exhaustive or otherwise limit or restrict the invention to the precise form and configuration shown in the drawings and disclosed in the following detailed description.

Referring to FIGS. 1-4, a seat belt buckle sub-assembly 10 is shown. Seat belt buckle sub-assembly 10 is a type of seat belt buckle sub-assembly 10 that is commonly mounted in the rear seat area of a vehicle or in a front bench seat area of a vehicle for providing a seat belt restraint system for two passengers, one seated on one side of the seat and the other seated in center of the seat. Seat belt buckle sub-assembly 10 includes first and second seat belt receptacles 12a and 12b that selectively receive seat belt buckles (not shown) within an opening 14a, 14b formed in a top portion 18a, 18b of each receptacle 12a, 12b. Seat belt receptacles 12a, 12b are also provided with release buttons 20a, 20b to selectively release the seat belt buckles from seat belt receptacles 12a and 12b.

Seat belt receptacles 12a and 12b are mounted on respective mounting arms 22a and 22b. Mounting arms 22a and 22b are fixedly secured to seat belt receptacles 12a and 12b in any suitable manner. In one embodiment, for example, a portion of mounting arm 22a is received within a channel (not shown) formed in seat belt receptacle 12a and screw fasteners (see FIGS. 1 and 2) are driven through the outer surface of seat belt receptacle 12a and mounting arm 22a thereby fixedly securing seat belt receptacle 12a to mounting arm 22a.

Seat belt buckle sub-assembly 10 further includes a mounting bracket 24 having a base portion 26 and upstanding ear portions 28a and 28b. Mounting bracket 24 has a mounting aperture 30 therethrough. Mounting aperture 30 receives a fastener assembly 32 to secure seat belt buckle sub-assembly 10 to the vehicle (to be explained in further detail below). Ear portions 28a and 28b further includes shafts 34a, 34b secured thereto. Shafts 34a and 34b extend inwardly toward one another from interior surfaces 36a, 36b of ear portions 28a and 28b. One end 38a and 38b of shafts 34a and 34b may also include a retaining flange 40a and 40b secured thereto.

Mounting arms 22a and 22b each include a mounting aperture (not shown). The mounting aperture receives one of the shafts 34a and 34b such that seat belt receptacles 12a, 12b are mounted to mounting bracket 24 for rotational movement about shafts 34a and 34b.

A biasing element 42a, 42b is associated with each seat belt receptacle 12a, 12b. In one embodiment, biasing element 42a, 42b is a torsion spring that includes a coiled section 43a, 43b, an anchor leg 44a, 44b and a pivoting leg 46a, 46b. Each coiled section 43a, 43b encircles one of the shafts 34a, 34b. Retaining flanges 40a, 40b prevent coiled sections 43a, 43b from slipping off shafts 34a, 34b. Anchor legs 44a, 44b extend laterally away from coiled sections 43a, 43b. Anchor legs 44a, 44b also each include a foot 78a, 48b that extends laterally away from anchor legs 44a, 44b. In one embodiment, each foot 48a, 48b terminates in a retaining finger 50a, 50b that is bent downwardly from each foot 48a, 48b. Each foot 48a, 48b is operatively connected to one of the mounting arms 22a, 22b. In one embodiment, each foot 48a, 48b extends through slots 52a, 52b that is formed through mounting arms 22a, 22b. Fingers 50a, 50b also extend through slots 52a, 52b and wrap over an edge of slot 52a, 52b such that fingers 50a, 50b contact an outside surface 54a, 54b of mounting arms 22a, 22b.

Pivoting legs 46a, 46b each extend laterally away from coiled sections 43a, 43b in a direction opposite from anchor legs 44a, 44b. Pivot legs 46a, 46b may each further include a foot 56a, 56b that selectively contacts a top surface 58 of mounting bracket 24 (to be explained in further detail below).

Once seat belt buckle receptacles 12a, 12b are secured to mounting bracket 24 via mounting arms 22a, 22b and shafts 34a, 34b, biasing elements 42a, 42b operate to bias seat belt buckle receptacles 12a, 12b in a generally upright installed position (FIGS. 2 and 4) such that when seat belt buckle sub-assembly 10 is secured to a vehicle, a seat portion does not cover or limit access to seat belt buckle receptacles 12a, 12b.

Figure 3:
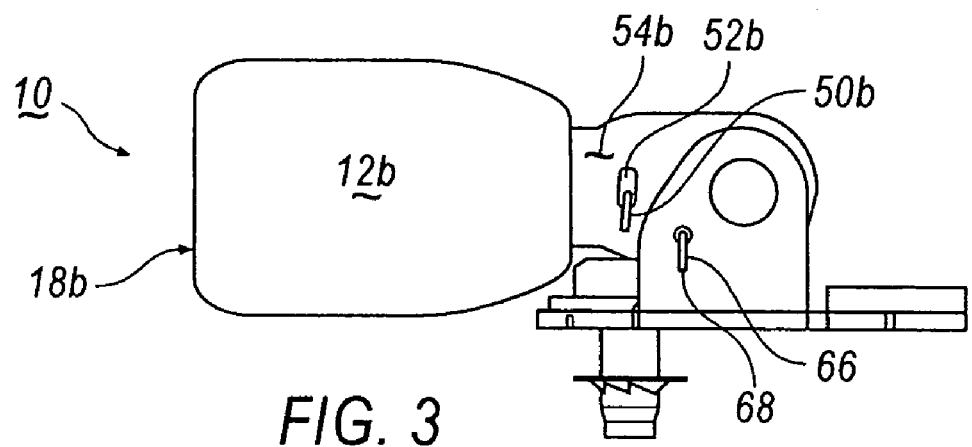
FIG. 3 is a side view of the seat belt buckle sub-assembly of FIG. 1 in the pre-installed position.

However, because seat belt buckle receptacles 12a, 12b are biased into the installed position, it is difficult to secure seat belt buckle sub-assembly 10 to the vehicle as access to mounting bracket 24 is restricted by seat belt buckle receptacles 12a, 12b. Indeed, the clearance between seat buckle receptacles 12a, 12b does not permit installation guns or other tools to pass therebetween. Accordingly, the biasing force of biasing elements 42a, 42b must be overcome to move seat belt buckle receptacles 12a, 12b into the pre-installed position (FIGS. 1 and 3). Once in this position, seat belt buckle receptacles 12a, 12b must be retained in the pre-installed position so that installation tools may access mounting bracket 24 so as to secure mounting bracket 24 to the vehicle body.

To retain seat belt buckle receptacles 12a, 12b in the pre-installed position, in one embodiment, mounting arms 24a, 24b are each provided with a first aperture 60a, 60b. Ear portions 28a, 28b are also each provided with a second aperture 62a, 62b. The biasing force of biasing elements 42a, 42b are overcome and seat belt buckle receptacles 12a, 12b are selectively rotated about shafts 34a, 34b until first apertures 60a, 60b are in co-axial alignment with second apertures 62a, 62b. A retaining element 64 having an outside diameter that is at least slightly smaller than the diameter of first and second apertures 60a, 60b, 62a, 62b is inserted through aligned first and second apertures 60a, 60b, 62a, 62b (FIGS. 1 and 3) to temporarily hold seat belt buckle receptacles 12a, 12b in the pre-installed position. Once locked into the pre-installed position, easy access to mounting bracket 24 is provided, without requiring an installer to manually hold seat belt buckle receptacles 12a, 12b in the pre-installed position. Fastener assembly 32 may then be is inserted within mounting aperture 26 to secure seat belt buckle sub-assembly 10 to the vehicle body by an installation tool.

Figure 2:
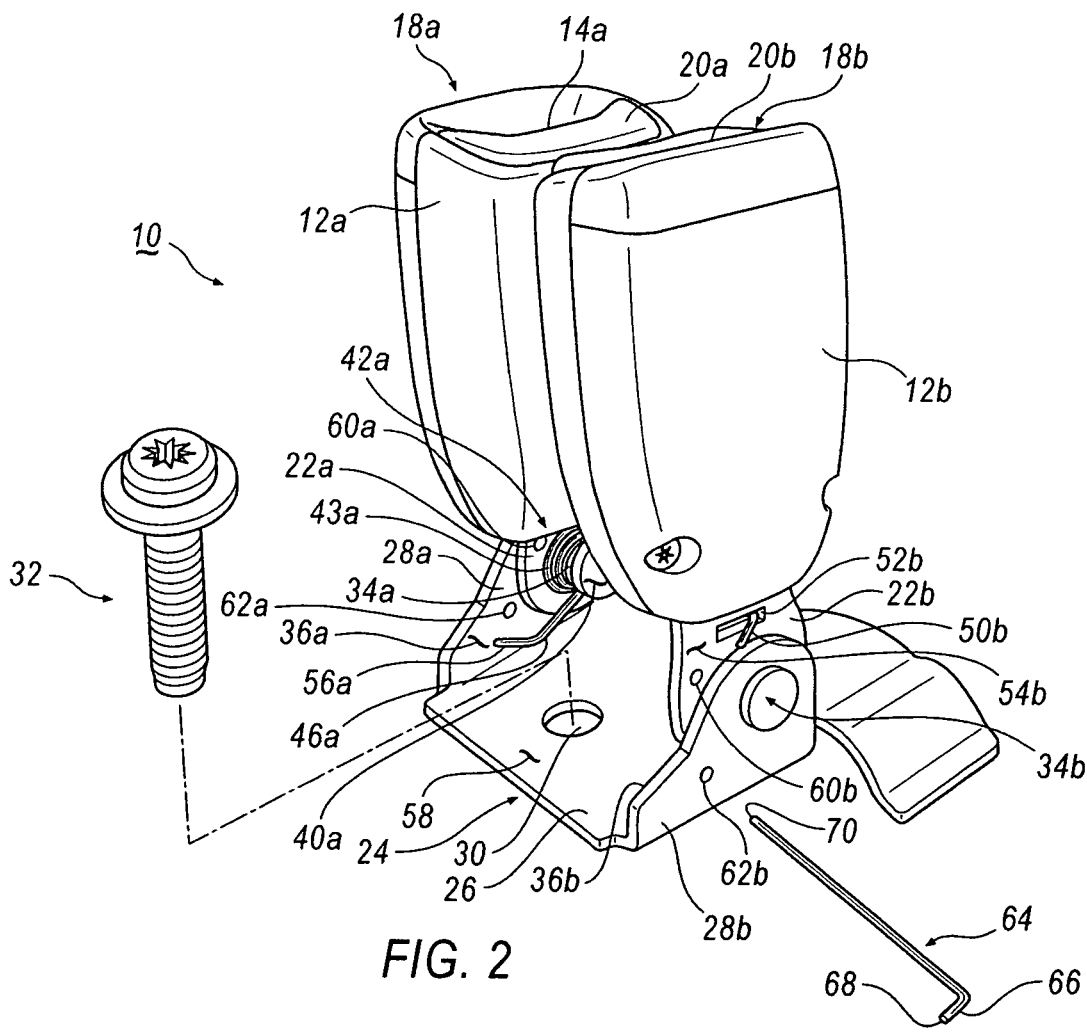
FIG. 2 is a perspective view of the seat belt buckle sub-assembly of FIG. 1 in an installed position with the temporary hold mechanism disengaged.
Figure 4:
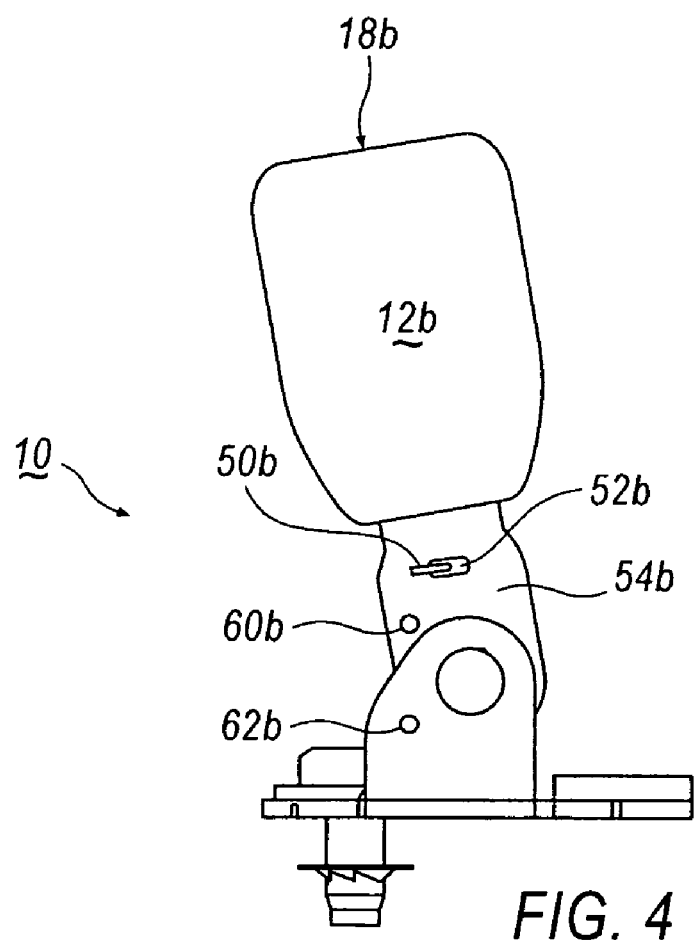
FIG. 4 is a side view of the seat belt buckle sub-assembly of FIG. 1 in an installed position.

Once seat belt buckle sub-assembly 10 is secured to the vehicle body, retaining element 64 may be selectively removed. Retaining element 64 may also include a gripping member 66 that permits easy withdrawal of retaining element 64. In one embodiment, gripping member 66 is a section of retaining element 64 that is bent at a predetermined angle. When inserted through aligned first and second apertures 60a, 60b, 62a, 62b gripping member 66 also acts as a stop mechanism to prevent a distal end 68 of retaining element 64 from passing through first and second apertures 60a, 60b, 62a, 62b. Gripping member 66 is also useful for allowing an installer to easily grip distal end 68 of retaining element 64 to pull retaining element 64 out of first and second apertures 60a, 60b, 62a, 62b. Once retaining element 64 is removed, biasing elements 42a, 42b automatically return seat belt buckle receptacles 12a, 12b to the installed position (FIGS. 2 and 4). Indeed, feet 56a, 56b of pivoting legs 46a, 46b act against top surface 58 of mounting bracket 24 to force seat belt receptacle 12a, 12b to return to the installed position.

Figure 5:
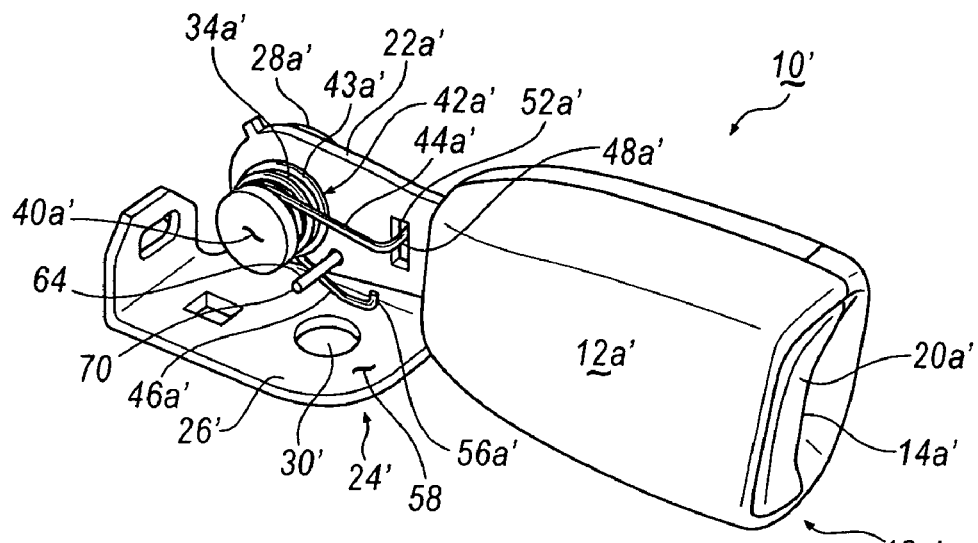
FIG. 5 is a single seat belt buckle sub-assembly in a pre-installed position that includes the first embodiment of the temporary hold mechanism.

While FIGS. 1-4 illustrate the use of a single retaining element 64 that extends through all apertures 60a, 60b, 62a, 62b, it is understood that each seat belt buckle receptacle 12a, 12b may be provided with a separate retaining element 64. Moreover, as shown in FIG. 5, retaining element 64 may also be employed with single seat belt buckle receptacle assemblies 10'.

While retaining element 64 is shown as having the configuration of a generally L-shaped solid rod, it is understood that other suitable configurations may be employed. For example, cotter pins may be used, retaining element 64 may be hollow, and/or gripping portion 66 may be not be bent, but rather have a diameter that is larger than the diameter of apertures 60a, 60b, 62a, 62b. It is also understood that neither the first and second apertures 60a, 60b, 62a, 62b nor retaining element 64 is limited to the particular shapes illustrated in FIGS. 1-5. Further, once installed through aligned apertures 60a, 60b, 62a, 62b a proximal end 70 of retaining element 64 may be provided with selectively removable cap (not shown) or other device to prevent accidental dislodgement of retaining element 64.

A seat belt buckle sub-assembly 100 employing an alternative embodiment of a temporary hold mechanism is shown in FIGS. 6-10. Seat belt buckle sub-assembly 100 has a similar structure as seat belt buckle sub-assembly 10. Accordingly, like elements of seat belt buckle sub-assembly 100 have been given the same reference numbers as shown for seat belt buckle sub-assembly 10.

The temporary hold mechanism of seat belt buckle sub-assembly 100 also includes the use of biasing elements 42a, 42b, having a similar construction as described in connection with seat belt buckle sub-assembly 10. However, biasing elements 42a, 42b cooperate with retaining lips 110a, 110b formed on ear portions 28a, 28b. Retaining lips 110a, 110b extend outwardly from a main body portion 112a, 112b, toward a forward edge 114 of mounting bracket 24. Retaining lips 110a, 110b cooperate with a lower forward edge 116a, 116b of each ear portion 28a, 28b to form a retaining groove 118a, 118b.

To selectively engage the temporary hold mechanism for seat belt buckle sub-assembly 100, the biasing force of biasing element 42a, 42b is overcome such that seat belt buckle receptacles 12a, 12b are selectively rotated about shafts 34a, 34b toward forward edge 114 of mounting bracket 24. Feet 48a, 48b, which are positioned through slots 52a, 52b, have a predetermined length such that feet 48a, 48b extend slightly outwardly from an outside surface 120a, 120b of mounting arms 22a, 22b. A portion of each retaining finger 50a, 50b is then positioned within each retaining groove 118a, 118b, underneath retaining lips 110a, 110b (see FIGS. 6, 7 and 8).

Figure 6:
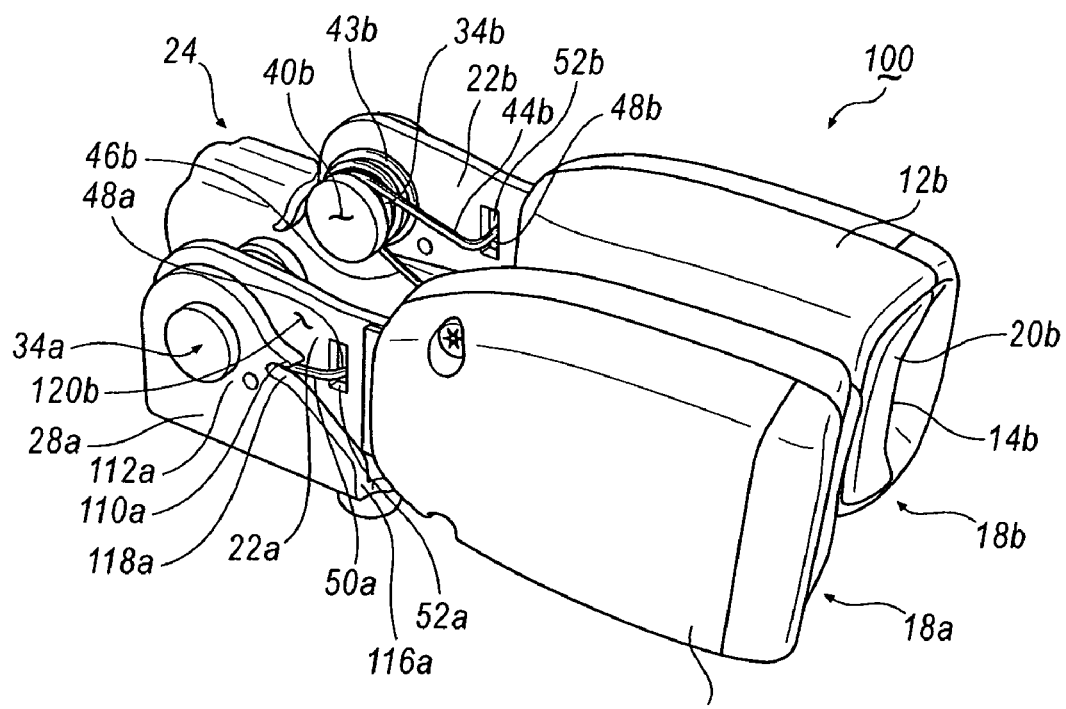
FIG. 6 is perspective view of a seat belt buckle sub-assembly in a pre-installed position that includes a second embodiment of a temporary hold mechanism.
Figure 7:
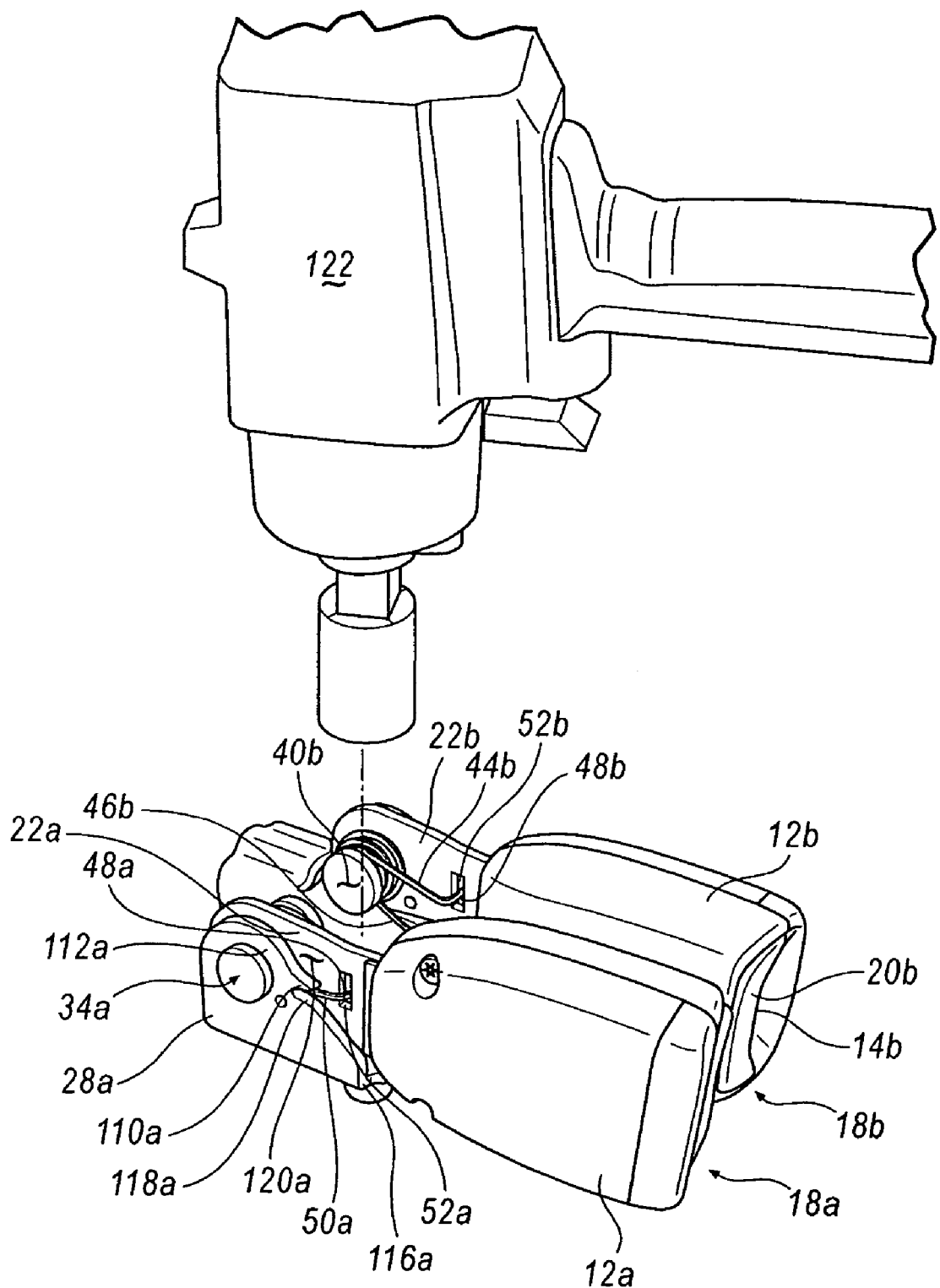
FIG. 7 is a perspective view of the seat belt buckle sub-assembly of FIG. 6 during the installation procedure.
Figure 8:
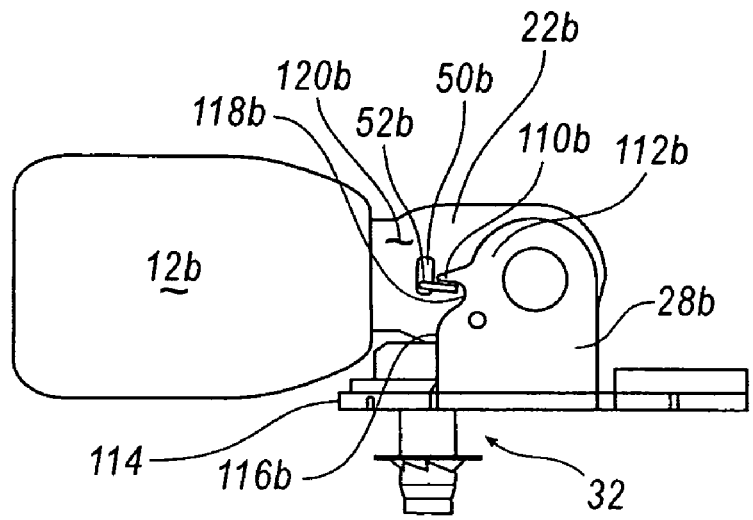
FIG. 8 is a perspective view of the seat belt buckle sub-assembly of FIG. 6 in an installed position with the temporary hold mechanism disengaged.
Figure 9:
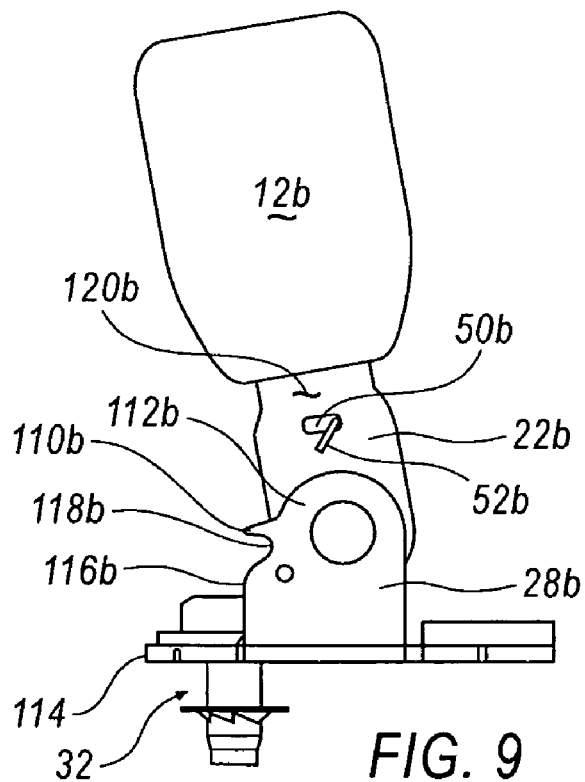
FIG. 9 is a side view of the seat belt buckle sub-assembly of FIG. 6 in the pre-installed position with the temporary hold mechanism engaged.
Figure 10:
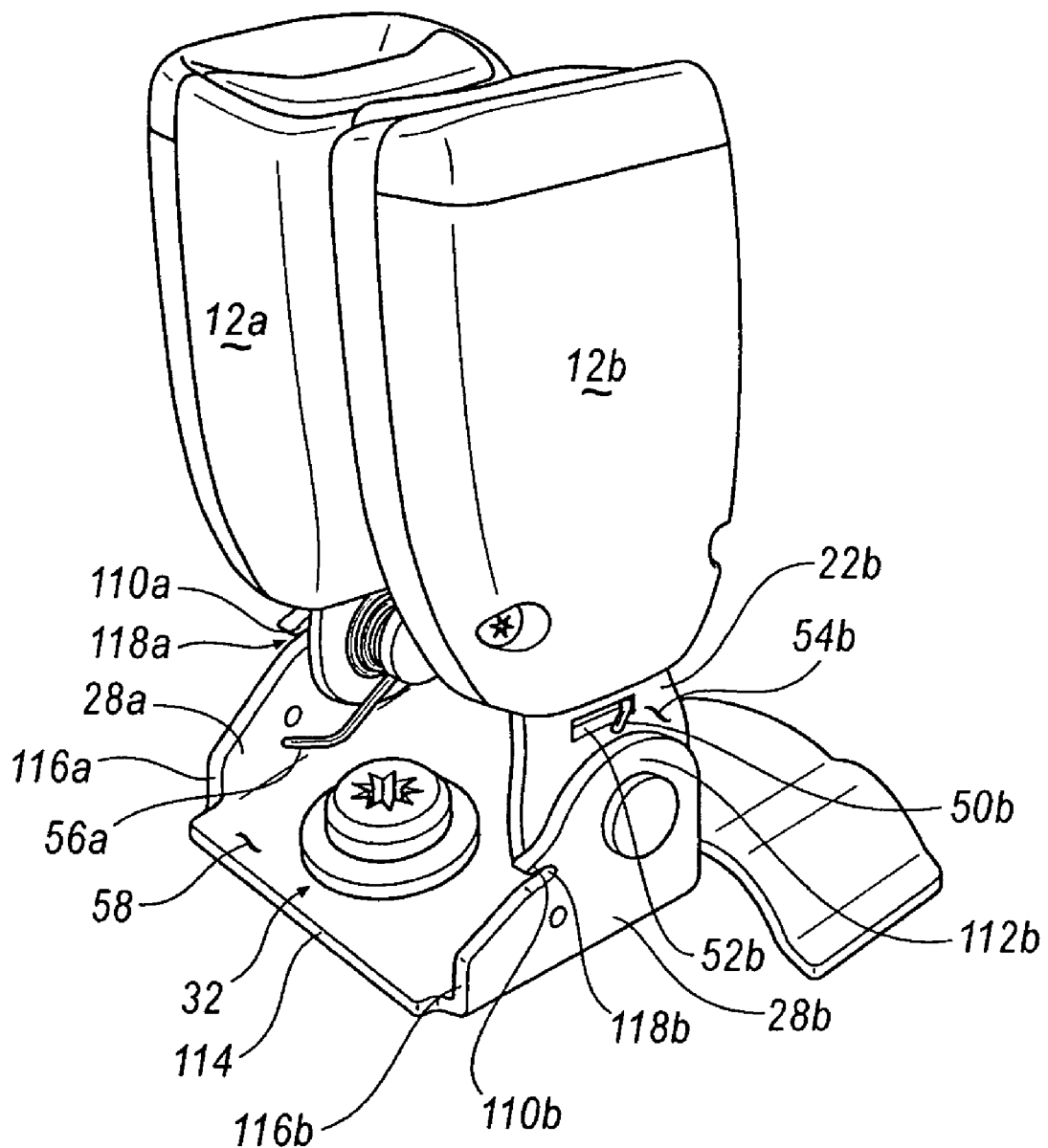
FIG. 10 is a side view of the seat belt buckle sub-assembly of FIG. 6 in the installed position with the temporary hold mechanism disengaged.

With fingers 50a, 50b engaged within each retaining groove 118a, 118b, seat belt buckle subassembly 100 is effectively maintained in the pre-installed position, as shown in FIGS. 6, 7, and 8. Once in the pre-installed position, installation tools, such as an installation gun 122, may easily access mounting bracket 24 to secure seat belt buckle sub-assembly 100 to a vehicle body.

After installation is complete, retaining fingers 50a, 50b may be selectively pulled laterally away from outside surface 120a, 120b such that retaining fingers 50a, 50b become disengaged from retaining grooves 118a, 118b. Once disengaged, biasing elements 42a, 42b will automatically return seat belt buckle receptacle sub-assembly 100 to the installed position.

While seat belt buckle sub-assembly 100 is shown as having a pair of seat belt buckle receptacles, it is understood that the temporary hold mechanism taught herein with respect to seat belt buckle sub-assembly 100 may also be employed with single seat belt buckle receptacle assemblies such as that shown in FIG. 5.

It should be understood that the aforementioned and other various alternatives to the embodiments of the invention described herein may be employed in practicing the invention. It is intended that the following claims define the scope of the invention and that the method and apparatus within the scope of these claims and their equivalents be covered thereby.

What is claimed is:

1. A temporary hold mechanism for a seat belt buckle sub-assembly, comprising
    a mounting bracket;
    at least one seat belt buckle receptacle mounted to said mounting bracket for rotational movement between a pre-installed position and an installed position;
    a biasing element operatively connected to said seat belt buckle receptacle to bias said seat belt buckle receptacle into said installed position; and
    a selectively removable retaining element that selectively maintains said seat belt buckle receptacle in said pre-installed position.

2. The temporary hold mechanism as claimed in claim 1, wherein said mounting bracket includes at least one upstanding ear portion having a shaft operatively connected thereto.

3. The temporary hold mechanism as claimed in claim 2, wherein said seat belt buckle receptacle includes a mounting arm and a receptacle portion; said mounting arm being mounted on said shaft for selective rotational movement.

4. The temporary hold mechanism as claimed in claim 2, wherein said biasing element is a spring having a coiled region, an anchor leg and a pivoting leg, said coiled region being mounted on said shaft and said anchor leg being secured to said seat belt buckle receptacle.

5. The temporary hold mechanism as claimed in claim 4, wherein said anchor leg further includes a foot portion that extends laterally away from said anchor leg, said foot portion engaging a slot formed in a portion of said seat belt buckle receptacle.

6. The temporary hold mechanism as claimed in claim 5, wherein said foot portion further includes a retaining finger that extends around an edge of said slot.

7. The temporary hold mechanism as claimed in claim 1, further including a first mounting aperture extending through said seat belt buckle receptacle and a second mounting aperture extending through a portion of said mounting bracket, wherein said first and second mounting apertures generally align when said seat belt buckle receptacle is selectively rotated into said pre-installed position and said aligned first and second apertures receive said retaining mechanism.

8. The temporary hold mechanism as claimed in claim 7, wherein said retaining mechanism has a cross-sectional shape that is complementary to said first and second apertures.

9. The temporary hold mechanism as claimed in claim 7, wherein said retaining mechanism is a pin member.

10. The temporary hold mechanism as claimed in claim 1, wherein said retaining mechanism further includes a gripping portion.

11. The temporary hold mechanism as claimed in claim 1, wherein said mounting bracket further includes a mounting aperture for receiving a fastener assembly to secure said mounting bracket to a vehicle body.

12. A temporary hold mechanism for a seat belt buckle sub-assembly, comprising:
    a mounting bracket having a pair of upstanding ear portions;
    a pair of seat belt buckle receptacle assemblies having mounting arms; said mounting arms secured to said ear portions for rotational movement between a pre-installed position and an installed position;
    a biasing element operatively connected to each seat belt buckle receptacle assembly to bias each of said seat belt buckle receptacle assemblies into said installed position; and
    at least one selectively removable retaining element that selectively maintains said seat belt buckle receptacle assemblies in said pre-installed position.

13. The temporary hold mechanism as claimed in claim 12, wherein said ear portions each further include a shaft fixedly secured thereto.

14. The temporary hold mechanism as claimed in claim 13, wherein biasing element is a spring having a coiled region, an anchor leg, and a pivoting leg, said coiled region of each spring being mounted on said shafts and said anchor legs being secured to said mounting arms.

15. The temporary hold mechanism as claimed in claim 14, wherein each of said anchor legs further include a foot portion that extends laterally away from each of said anchor legs, each of said foot portions engaging a slot formed in each of said mounting arms.

16. The temporary hold mechanism as claimed in claim 12, wherein each of said mounting arms further include a first mounting aperture extending therethrough, and wherein each of said mounting ears further includes a second mounting aperture extending therethrough; said first and second mounting apertures generally aligning when said seat belt buckle assembly is selectively rotated into said pre-installed position and said aligned first and second apertures receive said retaining mechanism.

17. The temporary hold mechanism as claimed in claim 12, wherein said retaining mechanism further includes a gripping portion.

18. A method for temporarily retaining a seat belt buckle receptacle assembly in a pre-installed position to facilitate installation, comprising:

providing a seat belt buckle receptacle assembly that includes a mounting bracket, at least one seat belt buckle receptacle that it selectively rotatable between an installed position and a pre-installed position, a biasing element operatively connected to said seat belt buckle receptacle that provides a predetermined biasing force to bias said seat belt buckle receptacle into said installed position, and a selectively removable retaining mechanism to selectively hold said seat belt buckle receptacle in said pre-installed position;

overcoming said biasing force and moving said seat belt buckle receptacle into said pre-installed position; and selectively engaging said retaining mechanism with said seat belt buckle receptacle to temporarily maintain said seat belt buckle receptacle in said pre-installed; wherein said retaining mechanism may be selectively removed from said seat belt buckle receptacle to return said seat belt buckle receptacle to said installed position.

19. The method of temporarily retaining a seat belt buckle receptacle in a pre-installed position as claimed in claim 18, wherein:

said seat belt buckle receptacle is further provided with a first mounting aperture on a portion thereof and said mounting bracket is further provided with a second mounting aperture on a portion thereof; and wherein said step of moving said seat belt buckle receptacle into said pre-installed position further includes aligning said first and second mounting apertures.

20. The method of temporarily retaining a seat belt buckle receptacle in a pre-installed position as claimed in claim 19, wherein said selectively engaging said retaining mechanism step further includes inserting said retaining mechanism through said aligned first and second mounting apertures.

* * * * *